US011820011B2

(12) United States Patent
Caron L'Ecuyer et al.

(10) Patent No.: US 11,820,011 B2
(45) Date of Patent: Nov. 21, 2023

(54) ROBOT ARM WITH SKELETON AND SKIN SHELL CONSTRUCTION

(71) Applicant: KINOVA INC., Boisbriand (CA)

(72) Inventors: Louis-Joseph Caron L'Ecuyer, Blainville (CA); Jonathan Lussier, Boisbriand (CA); Mathiew Moineau-Dionne, Boisbriand (CA); Alexandre Picard, Boisbriand (CA)

(73) Assignee: KINOVA INC., Boisbriand (CA)

( * ) Notice: Subject to any disclaimer, the term of this patent is extended or adjusted under 35 U.S.C. 154(b) by 240 days.

(21) Appl. No.: 16/875,397

(22) Filed: May 15, 2020

(65) Prior Publication Data

US 2020/0361081 A1 Nov. 19, 2020

Related U.S. Application Data

(60) Provisional application No. 62/849,288, filed on May 17, 2019.

(51) Int. Cl.
*B25J 9/10* (2006.01)
*B25J 18/00* (2006.01)

(52) U.S. Cl.
CPC ............... *B25J 9/106* (2013.01); *B25J 18/00* (2013.01)

(58) Field of Classification Search
CPC ... B25J 9/106; B25J 18/00; B25J 9/065; B25J 9/1615; B25J 17/00; B25J 9/0009; B25J 9/1635; B25J 15/12
See application file for complete search history.

(56) References Cited

U.S. PATENT DOCUMENTS

| | | | | |
|---|---|---|---|---|
| 10,486,304 B2* | 11/2019 | Xiong | ...................... | B25J 17/00 |
| D873,878 S * | 1/2020 | Vazquez | ...................... | D15/199 |
| 10,661,454 B2* | 5/2020 | Motokado | ............ | B25J 17/0283 |
| 2011/0257765 A1* | 10/2011 | Evans | ....................... | A61F 2/70 |
| | | | | 623/24 |
| 2013/0074637 A1* | 3/2013 | Choi | ...................... | A61B 34/71 |
| | | | | 74/490.05 |
| 2015/0093917 A1* | 4/2015 | Stern | ....................... | B25J 18/06 |
| | | | | 439/8 |
| 2016/0311108 A1* | 10/2016 | Alambeigi | ............. | A61B 1/128 |
| 2018/0207795 A1* | 7/2018 | Haddadin | ................ | B25J 18/00 |
| 2019/0381670 A1* | 12/2019 | Correll | .................... | B25J 9/106 |
| 2020/0352662 A1* | 11/2020 | Mampetta | ............. | A61B 34/30 |

FOREIGN PATENT DOCUMENTS

| | | | | |
|---|---|---|---|---|
| DE | 102016003080 A1 * | 9/2017 | ............ | B05B 12/24 |
| WO | WO-2010060561 A1 * | 6/2010 | ......... | B25J 19/0075 |

* cited by examiner

*Primary Examiner* — Zakaria Elahmadi
(74) *Attorney, Agent, or Firm* — NORTON ROSE FULBRIGHT CANADA LLP

(57) ABSTRACT

An articulated robot arm comprises a plurality of skeleton links. Motorized joint units forming joints between adjacent ones of the skeleton links such that the skeleton links of the adjacent ones are rotatable relative to one another. One or more skin shells are provided for the skeleton links, the skin shell forming a non-structural skin around the at least one of the skeleton links.

19 Claims, 7 Drawing Sheets

ROBOT ARM WITH SKELETON AND SKIN SHELL CONSTRUCTION

TECHNICAL FIELD

The present application relates to the field of robotics and haptics, and more particularly to robot arms that are part of assistive robots, also called lightweight robots.

BACKGROUND OF THE ART

Robot arms, such as assistive robot arms, are among the types of robot arms that are becoming more popular. They may bring autonomy to the user, enabling them to grasp a bottle of water, open a door, handle a hand held device such as a TV remote control, etc. without the help of another person. Such robot arms need to be lightweight to reduce power consumption, notably if their power comes from a wheelchair's batteries. However, as robot arms are often serial mechanisms that must support their own weight, the weight reduction must often be reconciled with the structural integrity of the arm links. Meanwhile, users may benefit from an economical robot arm.

SUMMARY

It is an aim of the present disclosure to provide a robot arm that addresses issues related to the prior art.

Therefore, in accordance with an embodiment of the present disclosure, there is provided an articulated robot arm comprising: a plurality of skeleton links; motorized joint units forming joints between adjacent ones of the skeleton links such that the skeleton links of the adjacent ones are rotatable relative to one another; and at least one skin shell for at least one of the skeleton links, the at least one skin shell forming a non-structural skin around the at least one of the skeleton links.

In accordance with another embodiment of the present disclosure, there is provided a link assembly for an articulated robot arm comprising: a skeleton link, the skeleton link having a strut portion extending between connection ends, the connection ends each configured to be connected to a motorized joint unit; and at least one skin shell, the at least one skin shell forming a non-structural skin around the at least one of the skeleton links.

DETAILED DESCRIPTION

Figure 1:
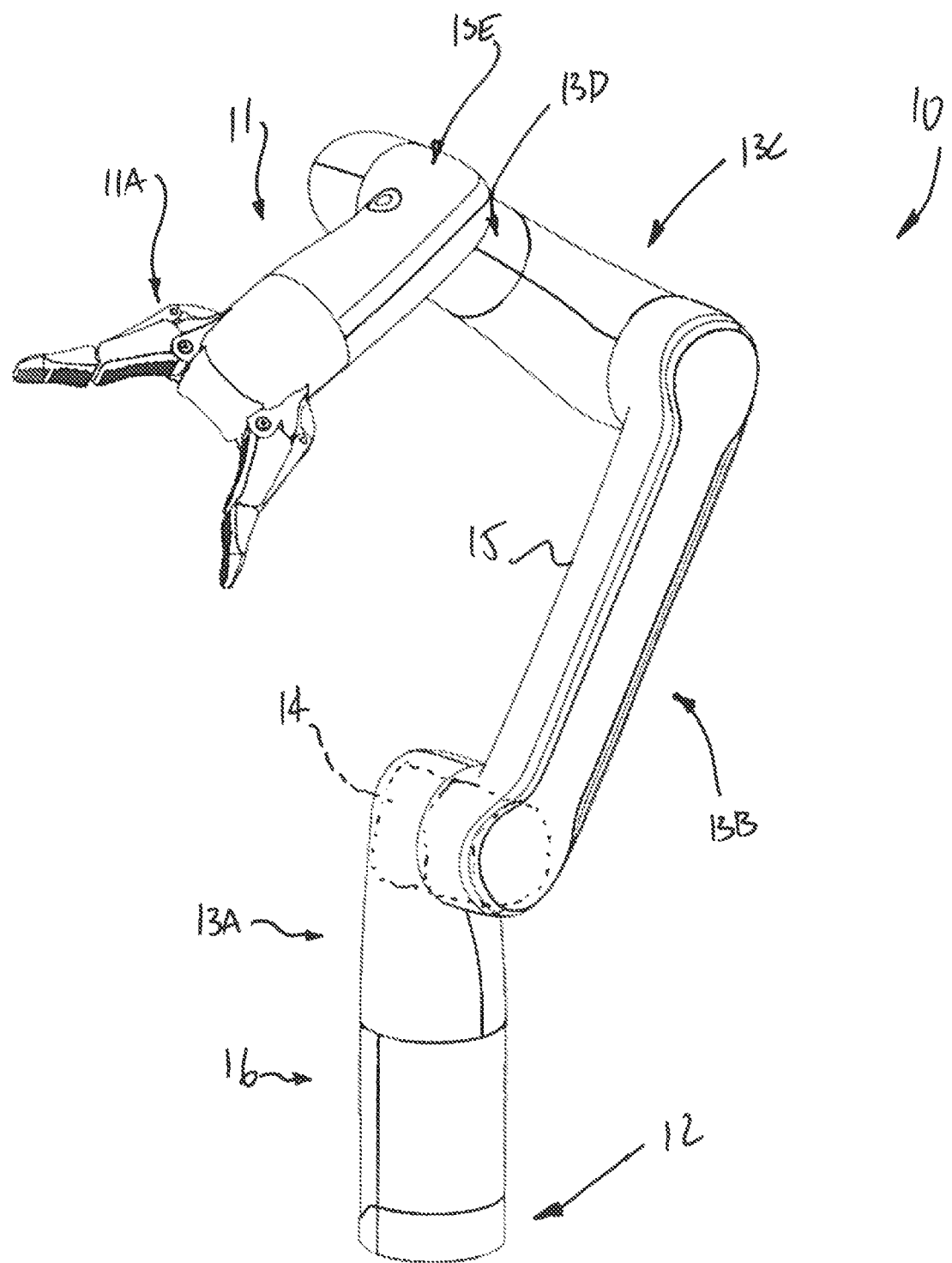
FIG. 1 is an isometric view of an articulated robot arm with skeleton and skin shell construction in accordance with an embodiment of the present disclosure.

Referring to the drawings and more particularly to FIG. 1, a mechanism such as a robot arm in accordance with the present disclosure is generally shown at 10. The robot arm 10 may be known as a robot, a robotic arm, an articulated mechanism, a serial mechanism, among other names. The robot arm 10 may be an assistive robot arm, an industrial robot arm, a collaborative robot arm, among other possibilities, with the robot arm 10 being devised for a variety of uses. For simplicity, the expression "robot arm" is used throughout, but in a non-limiting manner. The robot arm 10 is a serial articulated robot arm, having an effector end 11 and a base end 12. The effector end 11 is configured to receive any appropriate tool, such as gripping mechanism 11A or gripper—shown as an example as a two-finger gripper in FIG. 1 anamorphic hand, three-finger gripper, a suction cup, a magnetic gripper and tooling heads such as drills, saws, etc. The end effector 11A secured to the effector end 11 is as a function of the contemplated use, and is shown only as an example, as other types of end effectors may be used. It is also contemplated to have interchangeable end effectors. The robot arm 10 may be provided without any such tool, and ready for supporting a tool.

The base end 12 is configured to be connected to any appropriate structure or mechanism. The base end 12 may be rotatably mounted or not to the structure or mechanism. By way of non-exhaustive example, the base end 12 may be mounted to a wheelchair, to a vehicle, to a frame, to a cart, to a robot docking station, to a table, etc. Although a serial robot arm is shown, the joint arrangement of the robot arm 10 may be found in other types of robots, included parallel manipulators.

Figure 2:
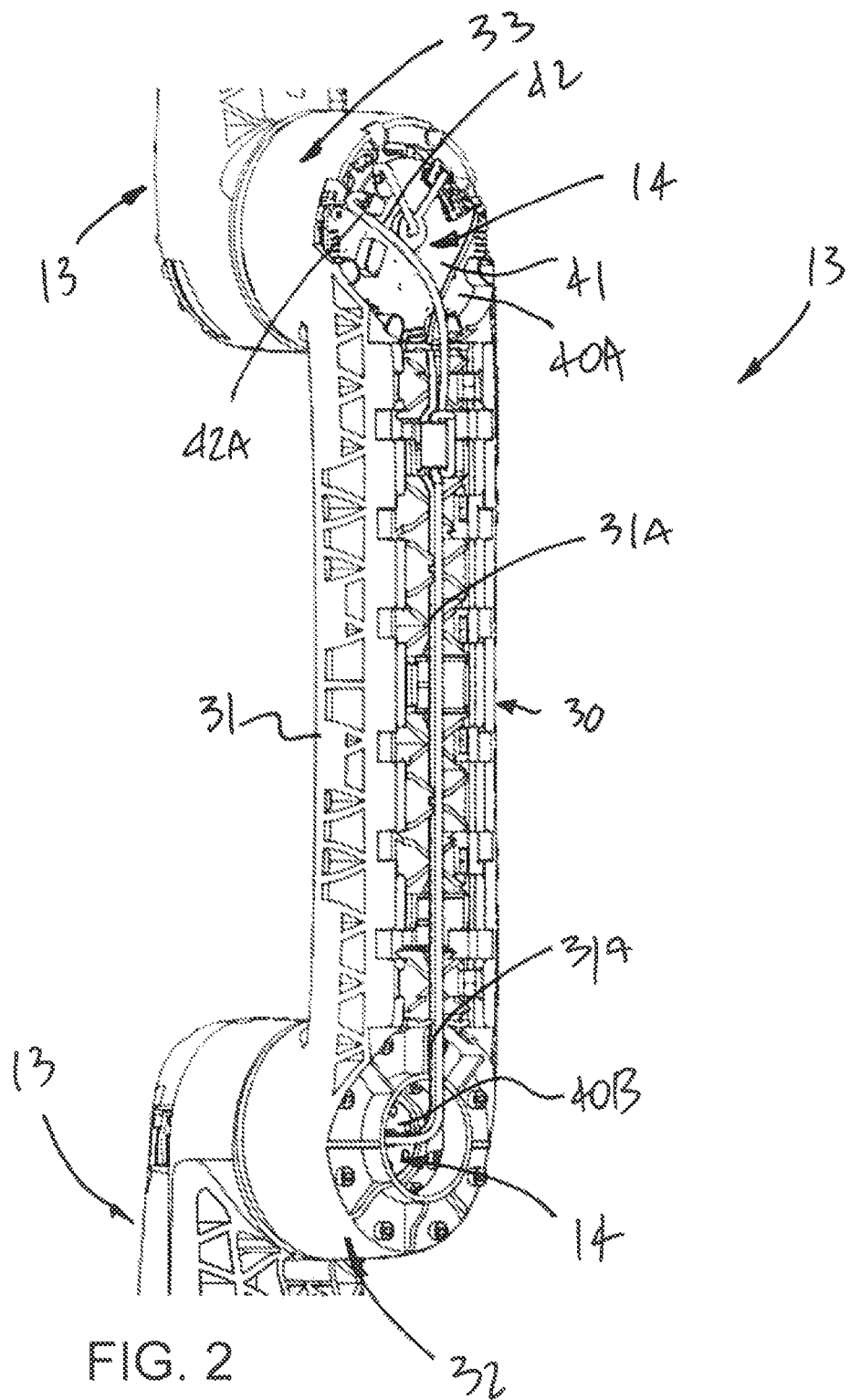
FIG. 2 is an isometric view of a skeleton link of the robot arm of FIG. 1 with skin shells removed.

Referring concurrently to FIGS. 1 and 2, the robot arm 10 has a series of skeleton links referred to concurrently as 13 (concealed in FIG. 2), interconnected by motorized joint units 14 (one schematically shown in FIG. 1), for example with protective skin shells 15 (removed in FIG. 2) defining a skin over the links 13. The links 13 are shown with letters affixed to them in FIG. 1 to distinguish them from one another, and they are concurrently referred to as skeleton links 13 or links 13. A bottom one of the links 13 is shown and referred to herein as a robot arm base link 16, or simply base link 16.

The skeleton links 13 and 16 have a structural function in that they form the skeleton of the robot arm 10, by supporting the motorized joint units 14 and tools at the effector end 11, with loads supported by the tools, in addition to supporting the weight of the robot arm 10 itself. Wires and electronic components may be attached to, concealed by or connected to the links 13 and 16, by internal routing.

The motorized joint units 14 interconnect adjacent links 13 and/or 16, in such a way that a rotational degree of actuation is provided between adjacent links 13 and/or 16. According to an embodiment, the motorized joint units 14 may also connect a link to a tool at the effector end 11, although other mechanisms may be used at the effector end 11 and at the base end 12. The motorized joint units 14 may also form part of structure of the robot arm 10, as they interconnect adjacent links 13 and/or 16. An exemplary motorized joint unit 14 is described in U.S. Pat. No. 10,576,644, incorporated herein by reference.

The skin shells 15 shield the links 13 and/or 16. The skin shells 15 may form a continuous fastener-less surface for the robot arm 10, with protected seams, though fasteners may be used as well.

The base link 16 is at the base of the robot arm 10 and, in addition to its structural function, is tasked with connecting the robot arm 10 to a structure and to a powering source. For example, the base link 16 may be on a workstation, bench, table, wheeled support, floor, etc.

In the illustrated embodiment of FIG. 1, the robot arm 10 has six motorized joints, that may provide six degrees of freedom of movement to the end effector 11A (e.g., three translations, three rotations). First skeleton link 13A is connected to the base link 16 and rotates along a generally vertical axis when the robot arm 10 is mounted on an horizontal surface. A second skeleton link 13B is connected to the first skeleton link 13A and they concurrently have a rotation axis generally transverse or perpendicular (if they lie in a same plane) to the rotation axis of the first skeleton link 13A relative to the base link 16. Hence, the second skeleton link 13B may therefore "swing" when its motorized joint 14 is activated, relative to the first skeleton link 13A. A distal end of the second skeleton link 13B is rotatably connected to a third skeleton link 13C, with a rotation axis being generally parallel to the rotation axis between skeleton links 13A and 13B. A distal end of the third skeleton link 13C is rotatably connected to a fourth skeleton link 13D, with a rotation axis between generally transverse to the rotation axis between skeleton links 13B and 13C. Likewise, a fifth skeleton link 13E and the fourth skeleton link 13D have a bend between them for their rotation axis to be transverse to the one between the skeleton links 13C and 13D. The end effector 11A may be rotatably connected to the fifth skeleton link 13E, about a rotation axis generally transverse to the one between the fifth skeleton link 13E and the fourth skeleton link 13D. This is an example of an arrangement of some of the links 13 and 16, with connections between adjacent links 13,16 generally straight or angled, i.e., arranged such that the rotation angles of the motorized joint units 14 at the opposed ends of any of the links 13 are parallel, perpendicular, or at any other angle. Some links 13 and 16 may be longer, etc. Other arrangements are contemplated, as the arrangement of FIG. 1 is merely provided as an example.

Referring to FIG. 2, an exemplary skeleton link 13 is shown. The skeleton link 13 of FIG. 2 is for example found in FIG. 1 as the second skeleton link 13B, with the motorized units 14 at its opposed ends having axes being generally parallel to one another ("generally" may include a variation of ±5 degrees). One or more of the skeleton links 13 of FIG. 1 may have the same configuration as the skeleton link 13 of FIG. 2, with some variations as expressed herein, such as length, orientation of rotational axes (i.e., not necessarily parallel), geometry.

According to an embodiment, as shown in FIG. 2, the skeleton link 13 may be made from one solid plastic piece, i.e., monoblock or monolithic, shown as body 30. The relatively low weight of plastic may enable the use of smaller motorized units 14 by lessening the overall weight of the serial mechanism. If manufactured with an injection molding technique, the skeleton links 13 may be manufactured at relatively low cost. Other fabrication techniques are applicable like additive manufacturing, machining, etc. could also be used to manufacture the skeleton links 13. The skeleton links 13 may be made of other materials like aluminum if other properties are required, such as more rigidity. The skeleton links 13 can also be made of other material like fiberglass reinforced plastic, carbon fiber, polyamide fiber, etc.

According to an embodiment, the body 30 is designed to have a hollow-cell structure using an approach similar to a honeycomb principle for it to be lightweight while keeping suitable structural integrity. In the illustrated embodiment, the hollow cells of the structure may be triangularly-shaped openings found in the structural segments, such as a strut portion 31. This construction, referred to for example as a latticed structure, may exhibit a suitable strength-to-weight ratio for such an application, i.e., one in which different types of loads may be involved. While the illustrated embodiment shows triangle shape openings, other geometric forms could be used. The honeycomb inspired approach used for the strut portion 31 may be a compromise between the need to remove material to have a lighter structure while keeping adequate rigidity on the skeleton links 13 as they define the arm segments of the robot arm 10. Though the expression honeycomb is used, the openings are not necessarily hexagonal as observed from the triangular openings described.

The strut portion 31 has at its opposed ends a proximal connector 32 and a distal connector 33 (concurrently, the connectors). The expression "proximal" is used herein to designate a direction closer to the base end 12, whereas the expression "distal" designates a direction closer to the effector end 11. The strut portion 31 is therefore essentially equivalent to a bone shaft of a skeleton, whereas the connectors 32 and 33 are the bone joints. The strut portion 31 may therefore be referred to as a strut, as a shaft, as a bone, among other possibilities. For simplicity, the expression "strut portion" 31 will be used herein. While it is shown as being generally straight in FIG. 2, the strut portion 31 may have a bend, a curve or an elbow shape among possibilities. The strut portion 31 may also define a cable route channel 31A, for hosting electronic wires for the interconnection of motorization units 14. The cable route channel 31A may conceal cables from a surface of the strut portion 31, such that the skin shells 15 may be applied against a surface of the strut portion 31 without the cables interfering.

Figures 3A, 3B:
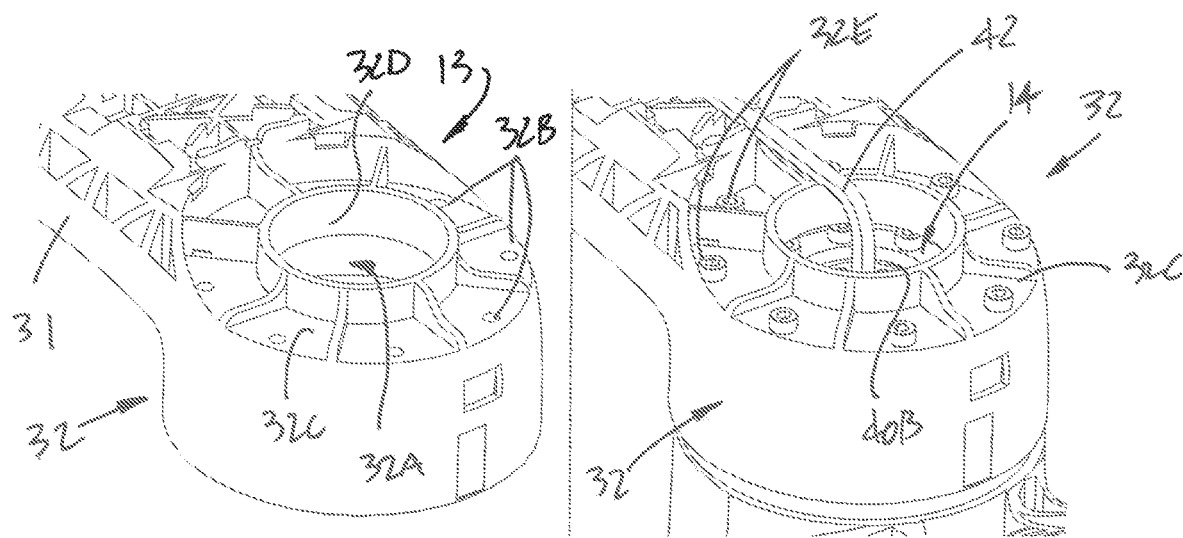
FIGS. 3A and 3B are isometric views of a first connector end of skeleton links of the robot arm of FIG. 1.
Figures 4A, 4B:
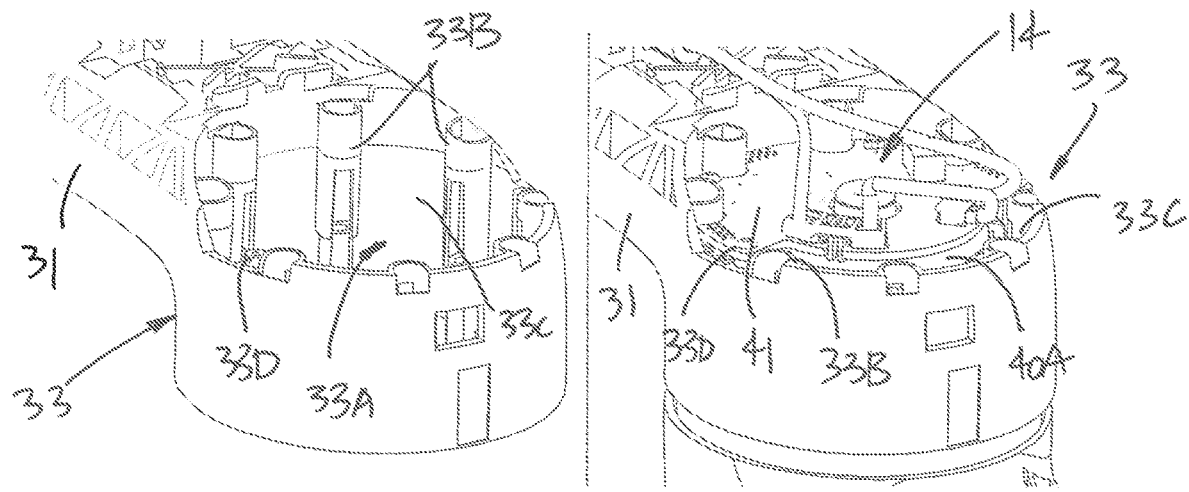
FIGS. 4A and 4B are isometric views of a second connector end of skeleton links of the robot arm of FIG. 1.

The connectors 32 and 33, also referred to as connector ends, are configured to receive the motorized units 14, for instance as shown in FIGS. 3B and 4B. The motorization units 14 are anchored to the connectors 32 and 33, and may contribute to the structure of the robot arm 10 by interfacing skeleton links 13, 16 to one another while also providing a rotational actuation between skeleton links 13, 16. According to an embodiment, the proximal connectors 32 of all skeleton links 13 are the same, and the distal connectors 33 of all skeleton links 13 are the same, whereby all motorization units 14 can be the same and used interchangeably at any joint between the skeleton links 13. In such an arrangement, a single type of motorization unit 14 may be kept in inventory for practical reasons. In another embodiment, the proximal connectors 32 are geometrically similar to one another, but with a reduction of size from proximal to distal, with the distal connectors 33 being in such an arrangement as well. Motorization units 14 could come in different sizes in such an arrangement.

The orientation of the proximal connectors 32 and distal connectors 33 relative to the strut portion 31 may differ according to the desired orientation between the rotational axes of the opposite ends of the skeleton links 13. For example, in FIG. 2, the rotational axes at the ends of the skeleton link 13 are parallel to one another, but as shown in FIG. 1, some of the skeleton links 13 may have transverse relations between their end rotational axes.

Referring to FIGS. 2, 3A and 3B, one of the proximal connectors 32 is shown as having a receptacle 32A. The receptacle 32A is sized so as to immovably receive therein half of the motorization unit 14. The motorization unit 14 is then secured to the proximal connector 32 while in the receptacle 32A. For this purpose, holes 32B may be circumferentially distributed in the receptacle 32A, such as in an abutment plate 32C. The abutment plate 32C may have a central bore 32D for wires or a wire harness to pass through it, as shown in FIG. 3B. In FIGS. 3A and 3B, the receptacle 32A is shown with the arrow passing through the central bore 32D, but the opposite end of the proximal connector 32 in FIGS. 3A and 3B may be of greater diameter than that of the central bore 32D, to form a female receptacle to receive a shell of the motorization unit 14. The diameter may be the same size as the diameter of the receptacle 33A of the distal connector 33, as described in FIGS. 4A and 4B below. According to an embodiment, the motorization units 14 of the robot arm 10 are connected in series, and the central bore 32D is an option among others for the wires to pass. Fasteners 32E may then be present for anchoring the motorization unit 14 to the receptacle 32A, through the holes 32B. The fasteners 32E may be axially oriented, i.e., parallel to the axis of rotation, but may be radially oriented as another possibility. Although not shown, other components may be present, notably for the angular alignment of the motorization unit 14 in the receptacle 32A (e.g., key and keyway).

Referring to FIGS. 2, 4A and 4B, one of the distal connectors 33 is shown as having a receptacle 33A. The receptacle 33A is sized so as to immovably receive therein the other half of the motorization unit 14. The motorization unit 14 is then secured to the receptacle 33A. For this purpose, posts 33B may be circumferentially distributed in the receptacle 33A, projecting inwardly (e.g., radially) from a circumferential wall 33C of the receptacle 33A. The receptacle 33A may essentially be tubular for wires or a wire harness to pass through it. Abutments 33D may be present and have threaded holes for a component (e.g., PCB) of the motorization unit 14, if present, to be attached to the distal connector 33. Fasteners may then be used for anchoring the motorization unit 14 to the receptacle 33A, through holes in the posts 33B, and for securing the PCB to the abutments 33D. The fasteners may be axially oriented, i.e., parallel to the axis of rotation, but may be radially oriented as another possibility. The distribution of the posts 33B may assist for the angular alignment of the motorization unit 14 in the receptacle 33A. Other configurations are considered for the distal connectors 33, such as being the same as the proximal connectors 32. Likewise, the proximal connectors 32 may have the geometry and components of the distal connectors 33 shown in FIGS. 4A and 4B.

Referring to FIGS. 1, 2, 3B and 4B, the motorization units 14 may have a first housing 40A and a second housing 40B (a.k.a., shells, casing portions, housing portions, etc), the first housing 40A received in the proximal connectors 32 and the second housing 40B received in the distal connectors 33. In an embodiment, a plane between the housings 40A and 40B has a vector of the rotational axis of the motorization unit 14 normal to it. Though not shown, the housings 40A and 40B may have surface features complementary to those of the proximal connectors 32 and distal connectors 33, respectively. For example, the housing 40A may have carvings or channels to accommodate the posts 33B. One or more of the motorization units 14 may have external electronics, such as a PCB or controller board 41, for instance as embodied by a printed-circuit board (PCB). Wires 42 may extend from motorization unit 14 to motorization unit 14, and may have plugs for connection with the controller board 41 or to motorization units 14, to facilitate an assembly of the robot arm 10. As shown in FIG. 2, a length of wire 42 may include excess wire, in the form of a loop 42A, to account for movements and facilitate cable installation and routing.

Figure 5:
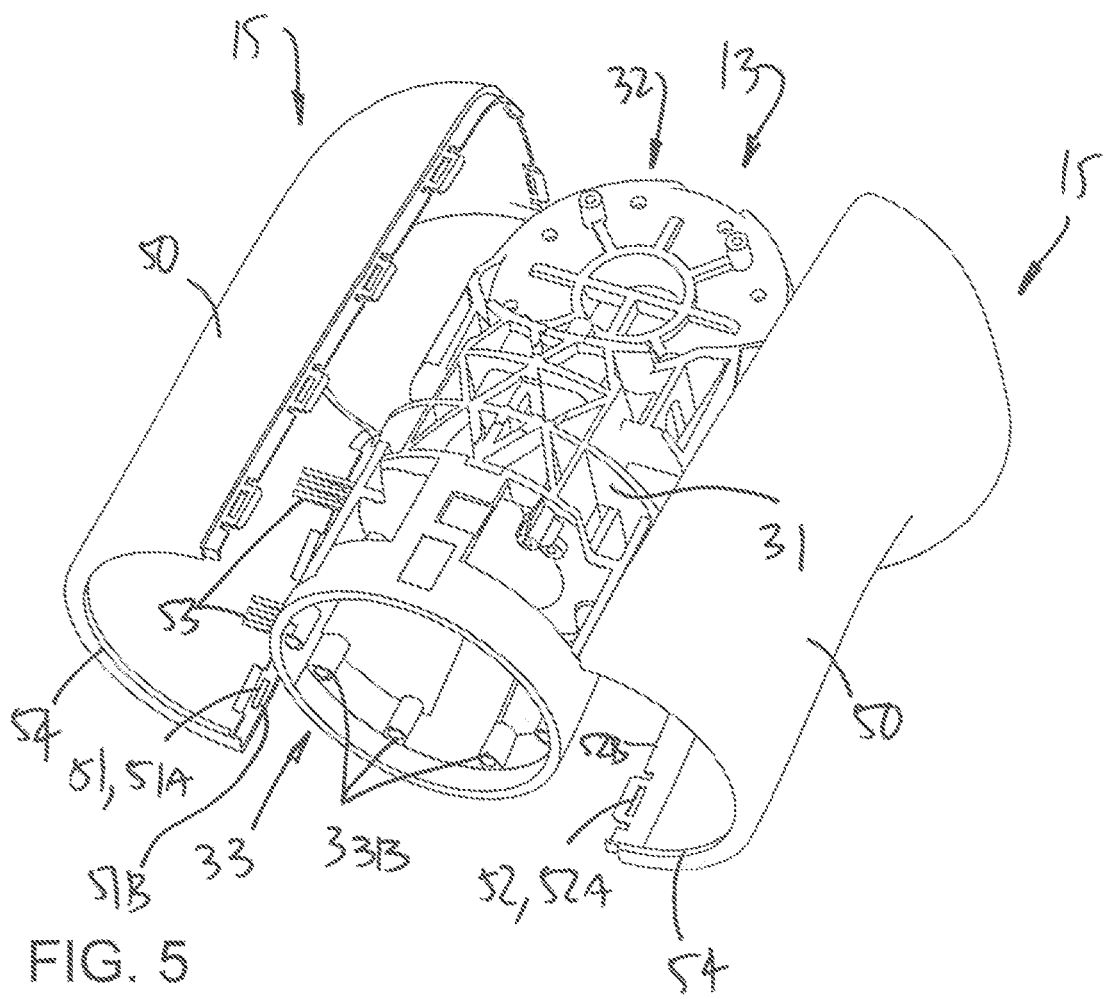
FIG. 5 is an isometric view of a first example of a skeleton link and skin shells for the robot arm of FIG. 1.

Referring to FIGS. 1, 5, 6 and 7, the skin shells 15 are shown in greater detail. The expression skin is used as the skin shells 15 have a protective, sealing, EMI shielding, sheathing and/or esthetic function, and may have no substantial structural role in supporting the weight of the robot arm 10. Accordingly, expressions such as cover, fairing, sheath could be used, as examples among others, to describe the skin shells 15. The skin shells 15 have cover bodies 50 that cover the skeleton links 13 up to the joints between interconnected skeleton links 13. As shown in FIG. 5, a skeleton link 13 may be fully covered by two or more of the cover bodies 50. It is considered to have a single shell 15 with appropriate elastic deformation capability to cover an entire link 13.

Figure 6:
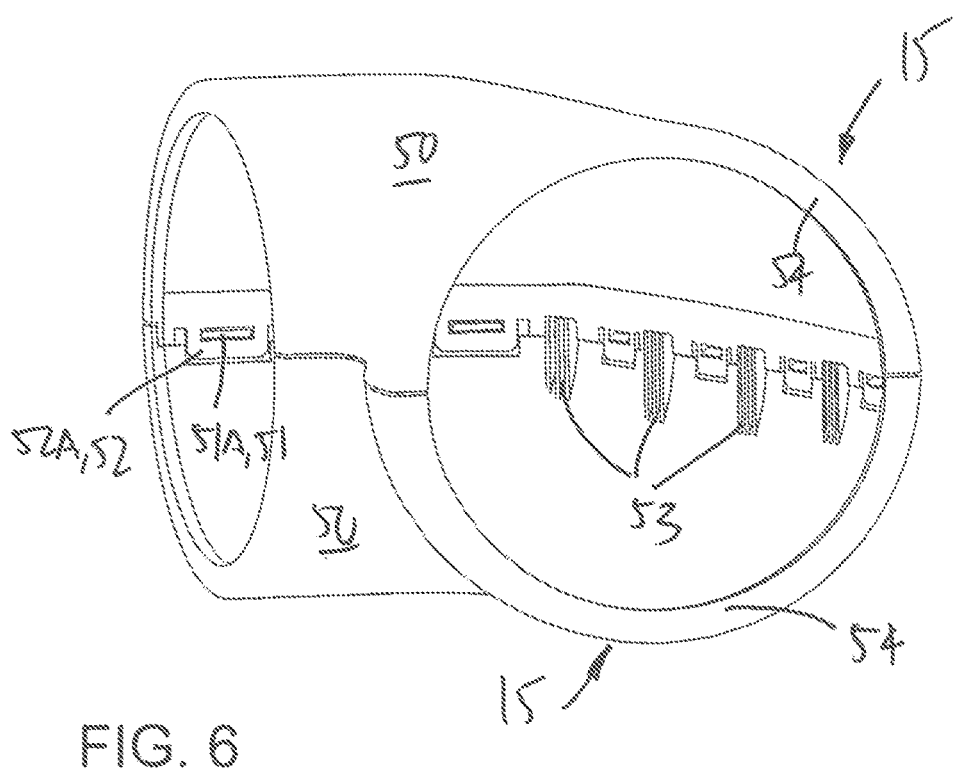
FIG. 6 is an isometric view of skin shells for the robot arm of FIG. 5.

Referring to FIGS. 5 and 6, the cover bodies 50 may have complementary connectors 51 and 52, such as catches 51A and tongues clips with slots 52A, or like complementary sets forming clips, for interconnection of the cover bodies 50 to one another. The catches 51A may also be known as wedge members, nails. In particular, the catches 51A may have a wedge surface for the clips with slots 52A to slide over and into engagement with the catches 51A. The clips with slots 52A, or tongues, may have suitable elastic deformation capability to deform for engagement with or disengagement form the catches 51A. The sets of catches 51A and tongues with slots 52A may also be known as male and female connector sets, with the catches 51A penetrating the slots 52A. The complementary connectors may be referred to as being fastener-less in that no fasteners are required other than the connectors in and of themselves. Other complementary pairs may be used as well, including ones with fasteners (e.g., set screws). The cover bodies 50 may also connect to the links 13 as opposed to being connected to one another. Alternatives includes threaded holes and fasteners, adhesives, snap-fit features, mating features, etc.

Moreover, complementary features such as channels, shoulders, and/or joints may be present. For example, overlap joint portions 51B, 52B may be present to protect seams between adjacent shells 15, and form an overlap joint. As observed from FIGS. 5 and 6, a shoulder may be defined as the overlap joint portion 51B, with the catches 51A projecting from a surface of the shoulder 51B. The shoulder may extend all along the edge of its shell 15, from the distal end to the proximal end. A step 51C may also be adjacent to the shoulder 51B, in continuation of the catches 51B, to receive a portion of the clip 52A when the catch 51A is matingly engaged in the slot thereof. The overlap joint portion 52B may be in the form of a flange, that extends intermittently between the clips 52A. The flange of the overlap joint portion 52B sits on the shoulder 51B when the shells 15 are interconnected as in FIG. 6. There may consequently result a relatively smooth outer surface for the interconnection shells 15, minimally disrupted by the seam between shells 15, with the seam being straight when observed from an elevation view. The seams may extend along the links 13, from between the proximal and the distal end, in an embodiment.

Ribs 53 may project from one of the two shells 15 to rigidify the assembly. For example, the ribs 53 define a slot with the shoulder 51B to receive the flange of the overlap joint portion 52B. This may ensure that the complementary sets of catches 51A and tongues with slots 52A remain interconnected unless a tool (e.g., flathead screwdriver) is forcefully inserted in the seam. The ribs 53 are one of the possible mechanical features that can be present for this purpose. The presence of such slots may ensure that the complementary surfaces along the seam (surface of the shoulder 51B and of the flange of the overlap joint portion 52B) remain in close contact to form a shield. Elastomeric seals could also be present to assist in this function.

In FIGS. 5 and 6, skin shells 15 are interconnected to one another, but are not individually connected to the skeleton link 13 they cover, e.g., the skin shells 15 may not be bolted or screwed directly to the skeleton links 13. In another embodiment, the shells 15 are not interconnected to one another, and connect to the links 13 instead. Inward flanges 54 may also be present to form smooth joint surfaces at the junction between interconnected skeleton links 13. With the presence of channels, shoulders, overlap joint portions 51B, 52B, tongue and groove joints, flanges 54, the skin shells 15 form an envelope around the inner components of the robot arm 10, whereby the seams between adjacent skin shells 15 are closed from the exterior when assembled onto the skeleton links 13. The overlap joint portions 51B, 52B form an elongated chicane protecting the seam against dust or water penetration.

FIG. 6 illustrates one example of how the skin shells 15 may be clipped in place when installed around one of the skeleton links 13 (not shown) of the robot arm 10. The skin shells 15 are for instance made from injection moulded plastics, as a possibility. The skin shells 15 may otherwise consist of any appropriate material, including composites, plastics, metals, or any combination thereof. In particular, the skin shells 15 are made of a hard material, such as a hard plastic (ABS, nylon), or metal sheeting that has sufficient elastic deformation capacity to be clipped onto the link 13, and then form a hard shell, with impact resistance. For example, the skin shells 15 have a rockwell hardness ranging between R 80 and R 114. The skin shells 15 may be coated, for example with paint. The skin shells 15 may be monolithic pieces, or may be an assembly of components, and may be molded, extruded, machined, etc. Built-in connectors 51 and 52 are found along a seam of the cover body 50. With the design of FIGS. 5-7, no tools may be required to assemble the skin shells 15 around the skeleton links 13. Also, with the design of FIGS. 5-7, no tools may be required to disassemble the skin shells 15 from around the skeleton links 13, or simply tools like a flat head screwdriver may suffice. This may allow simple access to the skeleton links 13 and internal components like the motorization units 14 and their controller boards 41 for servicing. A damaged skin shell 15 may be readily replaced by a replacement one. If they are manufactured by injection moulding, the cost of the skin shells 15 may be relatively low.

Figure 7:
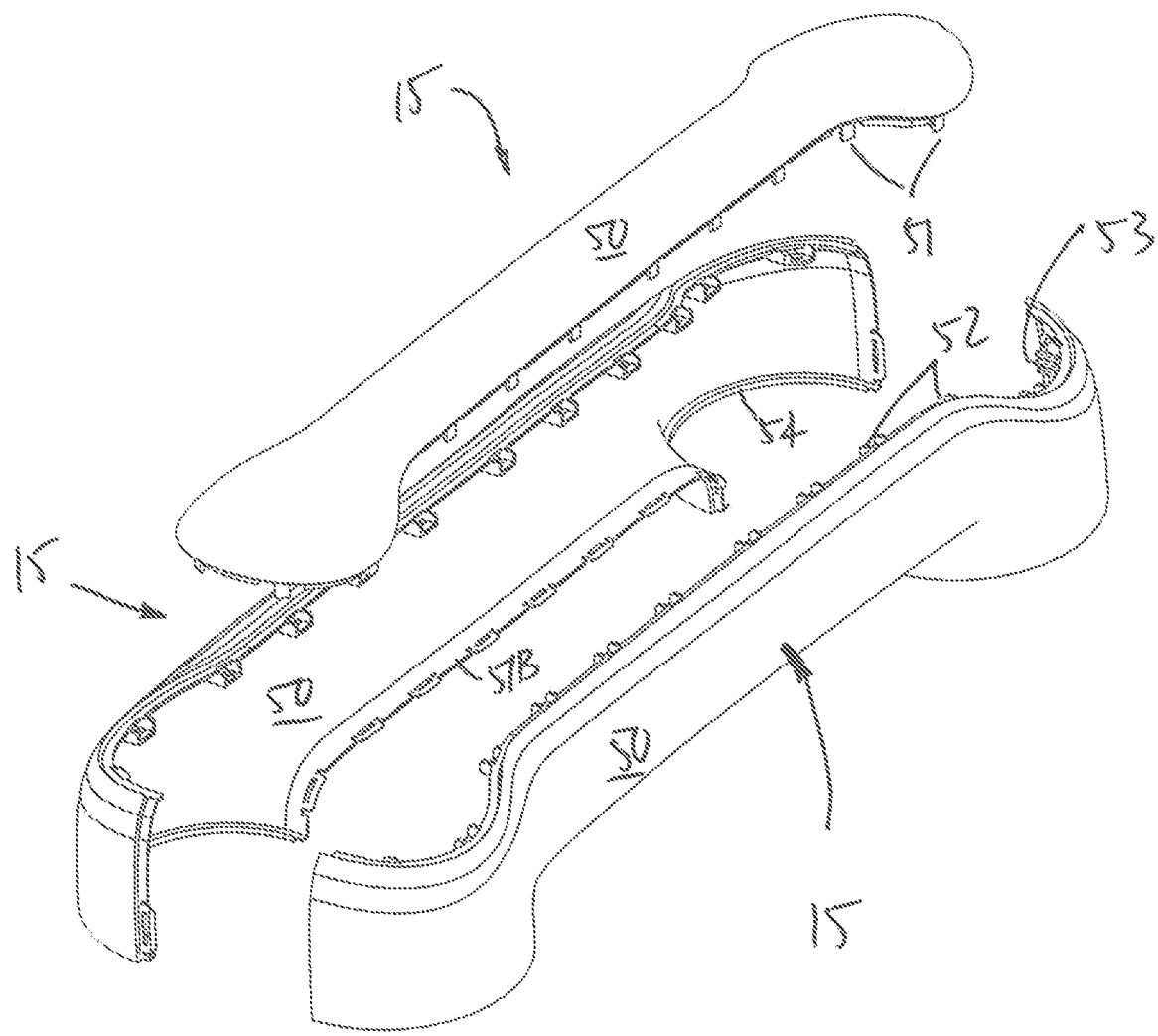
FIG. 7 is an isometric view of skin shells for the robot arm as shown in FIG. 2.

In the case of larger skeleton links 13, such as in FIG. 7, three or more different skin shells 15 can be used. The same principles detailed above with clips, flanges and complementary features may be applicable in this configuration. The illustrated embodiment with the skin shells 15 gives the robot arm 10 an esthetic look at a cost effective price point. The combination of one-piece skeleton links 13 and clipped-on skin shells 15 enable the production of an economical robot arm that may be esthetically appealing while preserving the benefits of standard articulated robot arms 10. The skin shells 15 may be described as being non-elastomeric, as they may exhibit a structural rigidity and/or hardness greater than a rubber, for example. Once the skin shells 15 are installed on the skeleton links 13, even if non structural, they form a rigid shield with little elastic deformation being exhibited. The skin shells 15 may thus be said to define a hard shell when installed onto the skeleton links 13. The skin shells 15 may be coplanar, or lie against the surface of the skeleton links 13, to define the hard shell. It may be necessary to have at least one seam, for the skin shells 15 to cover the links 13 and form a hard shell, in contrast to elastomeric sleeves that are simply slipped onto the links 13.

Figure 8:
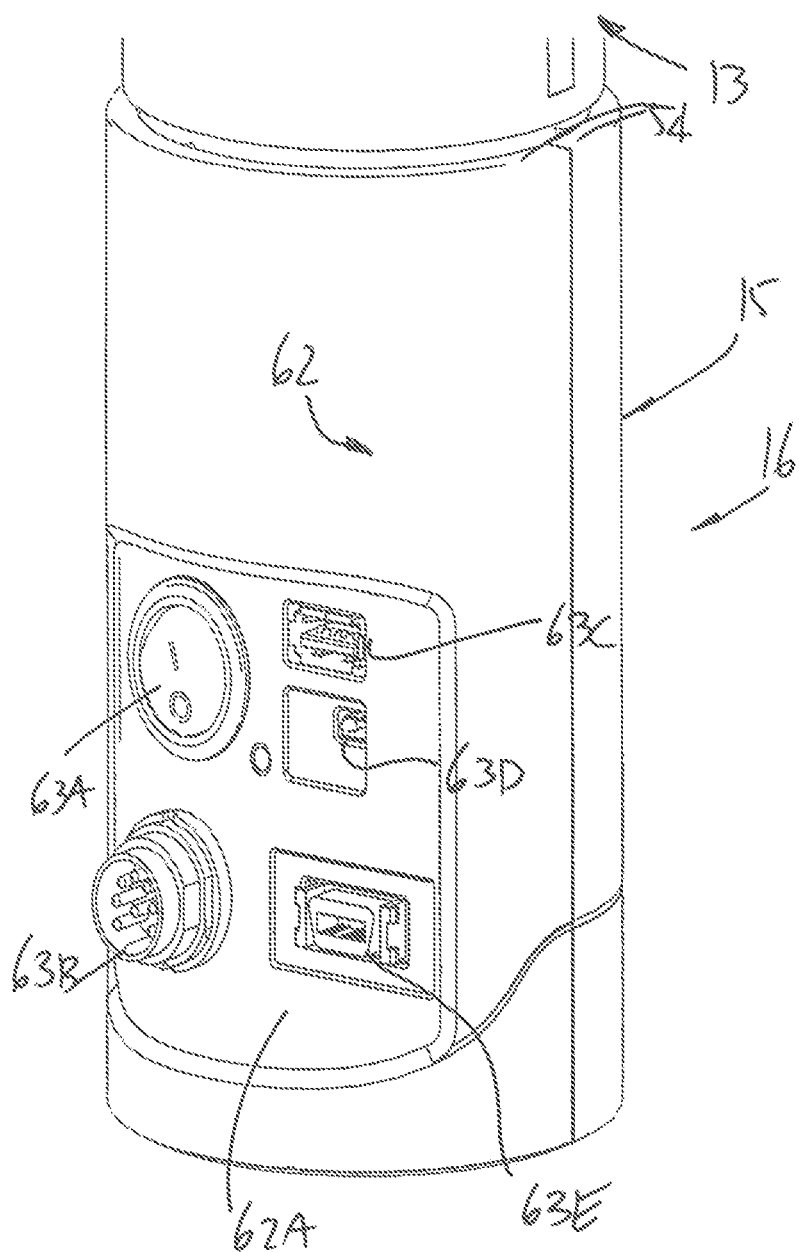
FIG. 8 is an isometric view of a base link of the robot arm as shown in FIG. 1.
Figure 9:
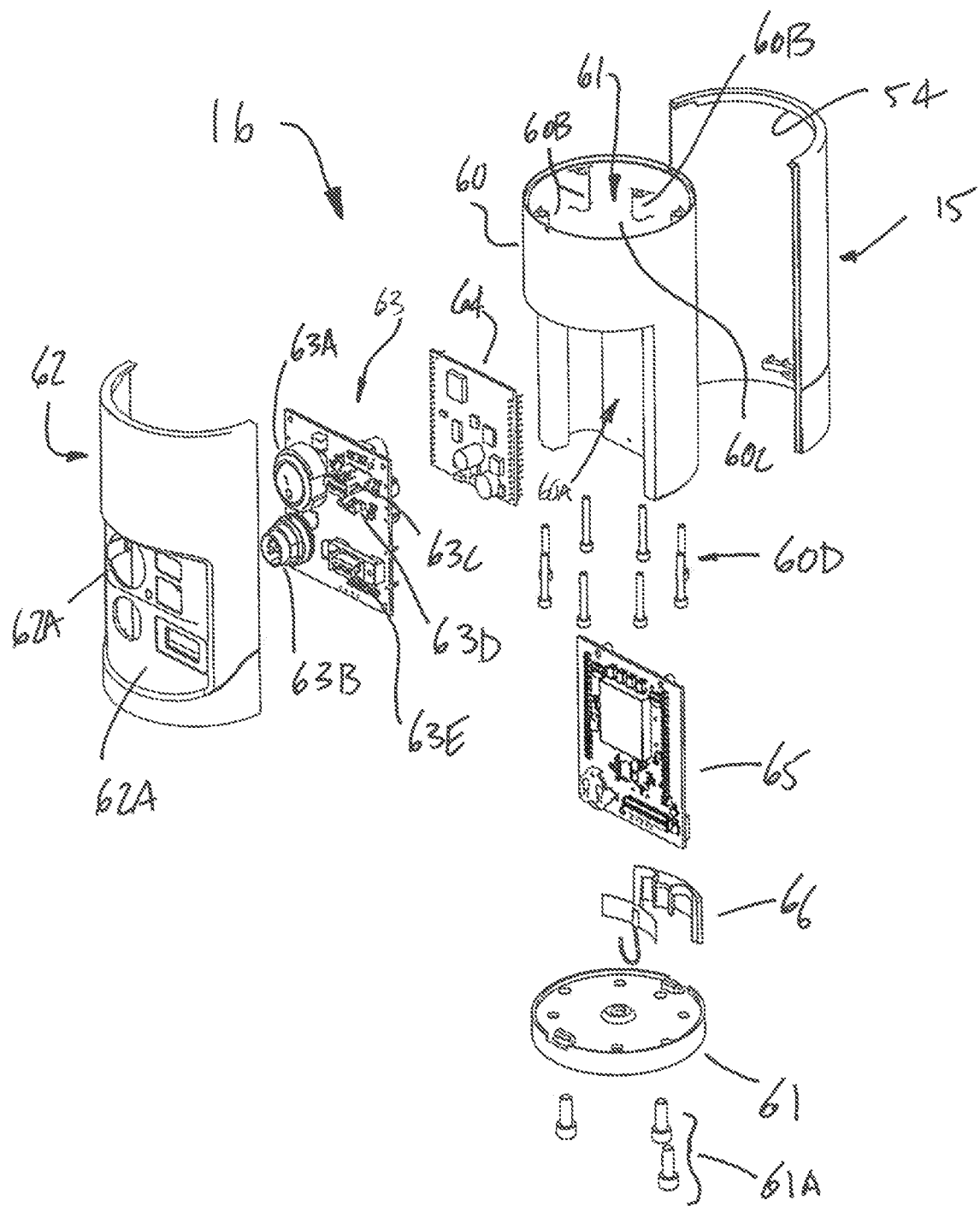
FIG. 9 is an assembly view of the base link of FIG. 8.

Referring to FIGS. 8 and 9, an exemplary embodiment of the base link 16 is shown in greater detail. The base link 16 may have a structural tube 60 that has the structural integrity to interface the robot arm 10 to a structure, while supporting the weight of the robot arm 10 and any load thereon. The structural tube 60 has a receptacle 60A that is similar in configuration to that of the proximal connectors 32, with posts 60B that may be circumferentially distributed in the receptacle 60A, projecting inwardly (e.g., radially) from a circumferential wall 60C of the receptacle 60A. A housing of the motorization unit 14 may be received in the receptacle 60A and anchored thereto, by fasteners 60D for example (whether oriented axially as shown, or radially as a possibility). A base plate 61 with its fasteners 61A may be used to fix or attach the base link 16 to a structure.

Skin shells 15 may be present, but with one of the skin shells shown as 62 having a face plate 62A supporting various user interfaces of a mezzanine card 63. For example, an on/off switch 63A may enables the user to power up the robot arm 10. 8-pin DIN connector 63B enables the user to link a 24V supply line to the robot arm 10. Other available connectors in the illustrative embodiment are USB socket 63C, Ethernet socket 63D and 15-pin serial socket 63E, among possibilities. These various user interfaces, connectors and sockets are presented for illustrative purpose only and other types of connectors and sockets can be present in the face plate 62A.

Other components may also be housed in the base link 16, such as shown in FIG. 9. Examples include mezzanine PCB 63, r-net card PCB 64, MPU PCB 65 and W-Fi antenna PCB 66, given merely as examples.

In the illustrated embodiment, no mounting brackets or plates, made by example of metallic material, need to be used in the assembly of the robot arm 10, within the skeleton links 13. While those brackets or plates can be useful to strengthen a robot arm, they add weight. Using those brackets or plates also add assembly steps which may be counterproductive.

The invention claimed is:

1. An articulated robot arm comprising:
   a plurality of skeleton links, at least a second one of the skeleton links has a latticed strut portion between connector ends, the connector ends for connection to a portion of the motorized joint units;
   motorized joint units forming joints between adjacent ones of the skeleton links such that the skeleton links of the adjacent ones are rotatable relative to one another, the motorized joint units interconnecting the adjacent ones of the skeleton links; and
   skin shells forming a non-structural skin around the at least one of the skeleton links;
   wherein, in a sequence of a first of the skeleton links, the second of the skeleton links and a third of the skeleton links in which the second skeleton link is interconnected to the first skeleton link and the third skeleton link at its opposed end, at least one of the skin shells covers the second skeleton link and is applied directly against a surface of the latticed strut portion of the second skeleton link such that the second skeleton link is entirely covered.

2. The articulated robot arm according to claim 1, wherein the links have a polymeric or metallic body.

3. The articulated robot arm according to claim 1, wherein at least one of the links has connector ends define receptacles for receiving a portion of the motorized joint units.

4. The articulated robot arm according to claim 1, wherein at least one of the skeleton links is a monolithic piece.

5. The articulated robot arm according to claim 1, wherein the at least one skin shell has complementary fasteners on opposed edges for clipping edges of the at least one skin shells to one another around the at least one of the skeleton links.

6. The articulated robot arm according to claim 5, wherein the edges of at least one of the skin shells are interconnected to one another fastener-less so as to be secured to the at least one of the skeleton links.

7. The articulated robot arm according to claim 5, wherein the complementary fasteners include sets of a catch and of a tongue and slot.

8. The articulated robot arm according to claim 5, wherein the edges of the at least one of the skin shells have complementary overlap joint portions to form an overlap joint at seams between the skin shells.

9. A link assembly for an articulated robot arm comprising:
a skeleton link, the skeleton link having a strut portion extending between connection ends, the connection ends each configured to be connected to a motorized joint unit, the skeleton link having a latticed strut portion between connector ends; and
at least one skin shell, the at least one skin shell forming a non-structural skin around the at least one of the skeleton links, the at least one skin shell being applied directly against a surface of the latticed strut portion to cover entirely the skeleton link.

10. The link assembly according to claim 9, wherein the skeleton link have a polymeric or metallic body.

11. The link assembly according to claim 9, wherein the connector ends are for connection to a portion of the motorized joint units.

12. The link assembly according to claim 9, wherein the skeleton link has connector ends define receptacles for receiving a portion of the motorized joint units.

13. The link assembly according to claim 10, wherein the skeleton link is a monolithic piece.

14. The link assembly according to claim 9, wherein the at least one skin shell has complementary fasteners on opposed edges for clipping edges of the at least one skin shells to one another around the skeleton link.

15. The link assembly according to claim 14, wherein the edges of the at least one skin shell are interconnected to one another fastener-less so as to be secured to the skeleton link.

16. The link assembly according to claim 14, wherein the complementary fasteners include sets of a catch and of a tongue and slot.

17. The link assembly according to claim 14, wherein the edges of the at least one of the skins have complementary overlap joint portions to form an overlap joint at seams between the skin shells.

18. The link assembly according to claim 10, including two of the at least one skin shell.

19. The articulated robot arm according to claim 1, wherein at least one of the skin shells covers the first skeleton link such that the first skeleton link is entirely covered.

* * * * *